Oct. 6, 1970  G. F. WYLY ET AL  3,532,800
EXTRA HIGH VOLTAGE OIL-IMPREGNATED SYNTHETIC
PAPER INSULATION AND CABLE
Filed March 10, 1969
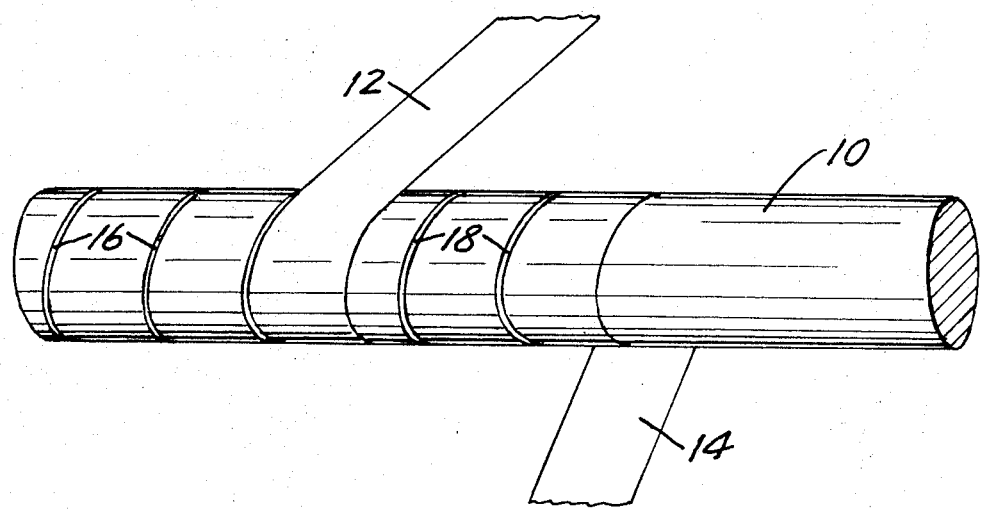
INVENTOR.
GRAYSON F. WYLY
BY Kinney, Alexander,
Sell, Steldt & DeLaHunt
ATTORNEYS United States Patent Office 3,532,800
Patented Oct. 6, 1970

3,532,800
EXTRA HIGH VOLTAGE OIL-IMPREGNATED SYNTHETIC PAPER INSULATION AND CABLE
Grayson F. Wyly and Charles A. Buehler, Brooklyn Park, Minn.; said Wyly assignor to Minnesota Mining and Manufacturing Company, St. Paul, Minn., a corporation of Delaware
Continuation-in-part of application Ser. No. 631,184, Apr. 17, 1967. This application Mar. 10, 1969, Ser. No. 814,875
Int. Cl. H01b 3/48, 3/02
U.S. Cl. 174—25
12 Claims

ABSTRACT OF THE DISCLOSURE

High voltage electrical insulation and cables utilizing insulating material formed from synthetic paper consisting of non-polar synthetic polymeric fibers less than 30 microns in diameter, with at least half of the fibers being less than 10 microns in diameter, suitable polymers being those with a melting point higher than 140° C. including polypropylene, poly 4-methyl pentene, copolymers thereof, polycarbonates, and polyphenylene oxides, the paper being saturated with cable oil, the composite having a dielectric constant less than 3 and a dissipation factor less than 0.001.

---

This case is a continuation-in-part of an application to Wyly, U.S. patent application Ser. No. 631,184, filed Apr. 17, 1967, and now abandoned.

This invention relates to the electrical insulation of cables, transformers, capacitors, and other conductors of electrical current and particularly cables useful for high voltage power transmission. More particularly, this invention relates to a new and improved oil impregnated insulating sheet material and to cables insulated therewith.

For many years the conventional dielectric for a wide range of electrical applications, e.g. transformers, capacitors, cables, cable bushings, cable splices, has been an oil-impregnated cellulose paper, generally kraft paper. The combination of paper and oil produces a composite having a dielectric strength greater than that of either of the two component materials. Over the years considerable improvement of the electrical quality of cellulose papers has been achieved, and oil impregnated kraft paper is, at present, probably the dielectric in widest use in high voltage applications, e.g. over 100,000 volts. However, the demand for higher and higher voltage transmission continues, and these demands are beginning to outstrip the improvements possible with oil saturated kraft papers. The cellulose-oil combination provides satisfactory insulating benefits for voltages up to about 345,000 volts. Above this range it does not appear that such a combination will be serviceable, as with rising voltages progressively larger fractions of the power being fed into the cable are used up in heating the insulation rather than being transmitted through the cable. This severely reduces power output and sharply increases the cost of power at the output end of the cable. Meanwhile the additional heat produced in the cable is a cause of added expense, since it must be dissipated to avoid shortening the life of the cable.

In insulation of high voltage conductors such as cables, kraft paper in the form of a paper tape is spirally wound around the conductor, the cable is dried under vacuum and with heat over a period of days or weeks to remove all moisture, and thereafter the insulating covering of kraft paper is impregnated while still under vacuum with purified oil (generally with the cable contained within a protective sheath, usually metal, which serves to retain the oil around the cable). In the usual high voltage cable range of up to about 345,000 volts operating around 400,000 volt-amperes, the dissipation factor of oil impregnated kraft paper is sufficiently low so that the heat produced during transmission of an alternating electrical field along the high voltage cable does not cause temperatures above 80° C., which is considered the maximum permissible continuous operating temperature for underground cable. However, at higher voltages greater dielectric heating occurs, since such dielectric heating is proportional to the square of the voltage.

[(Power converted to heat in insulation = (voltage)$^2$ (angular frequency) (capacitance) (dissipation factor) or $W = V^2 \omega C \tan \delta$]

Since for a given configuration C is proportional to K (the dielectric constant of the insulation), if voltage is to be increased, K and tan $\delta$ must be lowered to allow operation at the maximum temperature of 80° C. About the lowest dissipation factor achieved for an oil impregnated kraft paper is 0.0016.

Oil-impregnated kraft paper has other limitations which must be reckoned with in making the insulation for use at exceptionally high voltages. Among these limitations are: Dielectric constant, dielectric strength, and compatibility with the oil-impregnant at high operating temperatures (i.e. up to 80° C.).

It is desirable to have the lowest possible dielectric constant to minimize the effects created by alternating current, i.e. by expanding and contracting electromagnetic and electrostatic fields. Cellulosic paper impregnated with oil has a dielectric constant (permittivity) of about 3.5; thus, it is certainly not the best dielectric material available.

The dielectric strength, also called electric strength, is a critical property in the case of high voltage insulation. Generally speaking, the dielectric strength must be at least on the order of 1.4 kilovolts per mil (about 55 volts/micron) measured at a thickness of 5 mils (125 microns), or else the insulation is likely to break down. The dielectric strength of commercially available kraft insulating paper varies from poor to good depending upon a number of complex factors. A good discussion of these factors can be found in an article by Hall and Skipper, Proc. Inst. Elec. Engineers, 103A, page 571 (1956) and in an article by Hall and Kelk, ibid., 103A, page 564 (1956). For example, good dielectric strength can be obtained when the Gurley porosity value, a measure of impermeability, is as high as possible, and the apparent density value (see the definition of apparent density in Hall and Kelk, page 565) is also high. Thus, the ideal cellulosic insulation paper, from a dielectric strength standpoint, is an impermeable material. Unfortunately, impermeable insulation, i.e. insulation with a high Gurley value or a high apparent density, would defeat the very purpose of using an oil-impregnant. Good longitudinal and radial oil flow is essential to achieving the synergistic effect of oil impregnation. Thus, the desirability of maintaining a high electric strength must be balanced against the desirability of optimum oil flow characteristics. Maintaining maximum dielectric strength is also at odds with optimizing other desirable properties of the insulation such as the dissipation factor.

Another limitation of cellulosic papers relates to their compatibility with the oil-impregnant. Ideally, the paper should not be attached or dissolved by the oil such that it will soften or degrade in the operating temperature range for high voltage cables. Generally speaking, however, this limitation is not serious, because inexpensive hydrocarbon oils are compatible with, for example, kraft paper.

In recent years the art has turned to synthetic materials such as hydrocarbon polymers for answers to the problems outlined above. Polyethylene, polypropylene, and the like have been of particular interest, because these polymers are known to be characterized by low dielectric constants. The dielectric constant of oil-impregnated kraft paper is likely to be about 3.5, as compared to 2.5 or lower for these polyolefins. In addition, synthetic polymeric films have been produced which have low moisture sensitivity and high tensile strength. However, the use of, for example, polyethylene or polypropylene insulation materials in high voltage applications raises a host of problems, some of which are not encountered in the oil-impregnated cellulosic paper art.

The first problem encountered involves the selection of a suitable polymer material. It is not enough to select a polymer which has a suitable dielectric constant. It must be borne in mind that the polymer will be subjected to an environment in which the temperature can be as high as 80° C. under normal conditions and as high as 110° C. under overload conditions. The polymer will be in intimate contact with some type of an oil and will be in the presence of a strong, fluctuating electric field. It is difficult to predict in any straightforward way the adverse effects of these environmental conditions on the tensile strength and softening properties of the polymer, but the following factors appear to be significant: the softening point, melting point, and glass transition temperature of the polymer, and the nature of the oil impregnant. The softening point should be above 110° C., the melting point well above the softening point, and the glass transition temperature should not be in the operating temperature range. The selection of the oil-impregnant can only be determined empirically. Economic factors favor the use of hydrocarbon oils and other oils conventionally used with cellulosic insulation, but not all synthetic resins are completely compatible with such oils. For example, it is known that the conventionally-used hydrocarbon cable oils can have a softening effect on polyethylene, the effect becoming more pronounced at temperatures approaching the softening point of the polymer. See Olds, U.S. Pat. No. 3,077,510, issued Feb. 12, 1963, column 1, line 43, et seq. The undue softening effect observed in the case of polyethylene and similar polymers such as polybutene-1 can be obviated at least in part by using polymers of ethylene or 1-butene having molecular characteristics which maximize the melting point. For example, polyethylene with a melting point of 135° C. can be made and, in the absence of an electric field and a hydrocarbon oil impregnant, has a softening point above 110° C. However, under the operating conditions described above, the softening point can be lowered somewhat and can even approach the operating temperature prevailing under overload conditions. If the operating temperature actually reaches the softening point, a drastic loss in tensile strength can result. Needless to say, if the operating temperature were to reach the melting point of the polymer, catastrophic failure could be expected.

An aspect of this invention is the discovery that polymers with a melting point above 140° C. can withstand high voltage cable environments. That is, such polymers, even when impregnated with the conventional hydrocarbon oils, are not significantly softened at 110° C. or under overload conditions. Polymers with lower melting points, e.g. polyethylene and polybutene-1, can also be used with such oils, but there is some risk that, even though the operating temperature remains below the softening point of the polymer, a significant amount of tensile strength may be lost under overload conditions.

The dissipation factor (tan δ) can also be adversely affected by high voltage cable environments if polar impurities are present. Furthermore, certain polymers are themselves too polar to be used to make high voltage insulating paper, an example of such a polymer being polyethylene terephthalate.

Another problem involves the oil flow characteristics of the insulation made from the polymers. A self-sustaining tape or film of polypropylene or other synthetic polymer films is normally impermeable. While this lack of permeability is helpful from the standpoint of dielectric and tensile strength, it is disasterous insofar as longitudinal and radial oil flow characteristics are concerned. One proposed insulation for voltage cables comprises tapes of polypropylene film wrapped around the cable in layers and impregnated with polypropylene oil, e.g., see U.S. Pat. No. 3,229,024, issued Jan. 11, 1966. In this and similar schemes, a self-sustaining tape or film of polypropylene or other synthetic polymer film has a surface etched, embossed or otherwise treated to provide surface passages therealong to permit impregnation between the layers of film with oil. The tape is wound on a cable and oil is forced under the tape. The synthetic polymer films are not pervious to the oil, and thus radial pass-through is not provided between film layers, except between wraps of the film. Radial flow along the length of the cable is required as the cable expands and contracts on heating and cooling and upon bending of the cable. Radial flow is also desirable to permit thorough impregnation of the paper with oil, and to allow heat transfer by convection in the oil phase. Unlike cellulose paper which permits radial as well as longitudinal transfer of oil, the synthetic films are deficient in this respect. It has been suggested to punch holes in the polymer films to allow for radial flow, but such constructions have been found to suffer a loss of the above-noted increase in dielectric strength, and moreover uniform radial flow of oil is not possible, as undesirable pockets of oil are entrapped in areas between the holes.

It has been suggested that oil-impregnation could be improved through the use of insulation made from polyethylene fibers or particles. See the Olds Pat., 3,077,510, mentioned above, column 2, line 15 et seq. Unfortunately, additional problems are encountered when fibrous or particulate polymeric materials are used in oil-impregnated insulation. First, polymer fiber-making processes result in a product which is ordinarily contaminated with polar impurities such as wetting agents, anti-oxidants, etc. Such polar impurities can increase the dissipation factor of the polymer-containing insulation. Therefore, although a particular polymer might theoretically have a dissipation factor less than 0.001, fibers made from that polymer might have a considerably higher dissipation factor. Furthermore, as pointed out previously, the polymer itself should be substantially free of polar groups.

Second, when one makes a high voltage insulating paper from particulate polymeric materials, e.g. continuous or staple fibers, the probable loss of dielectric strength and/or tensile strength must be taken into account. The dielectric strength problem is in many respects the most serious. If the Gurley value is reduced so as to improve permeability to an oil-impregnant, the dielectric strength could be expected to fall below 1.4 kv./mil, and the resulting paper could be unsuitable for high voltage application. Therefore, although it has been suggested that porous webs of synthetic fibers might be useful in the field of electric insulation, e.g. see Canadian Pat. No. 723,075, issued Dec. 7, 1965, there has been to date no successful application of such webs in the art of oil-impregnated high voltage insulation.

Accordingly, this invention contemplates high voltage insulation made from a synthetic, oil-impregnated paper wherein this synthetic paper has dissipation factor and dielectric constant values substantially superior to, i.e. substantially below, those of oil saturated cellulosic paper, these superior values being obtained without unduly increasing the Gurley value or sacrificing the electric strength. The invention further contemplates the use of this high voltage insulation in a high voltage electrical cable.

The objects of this invention are achieved by providing a high voltage electrical cable having wrapped thereon as an insulating material a multiplicity of layers of synthetic paper saturated with purified oil. The fibers of the paper are formed from a high molecular weight non-polar synthetic polymer having a softening point above 110° C. and are less than about 30 microns in diameter with at least one-half of the fibers (by weight) being less than 10 microns in diameter, preferably less than about 6 microns in diameter. The melting point of the synthetic polymer is preferably above 140° C. The paper should be essentially free of polar impurities, for example soluble salts, wetting agents, anti-oxidants, etc.

According to this invention, when the fibers making up the synthetic paper have the above-described characteristics, i.e. the specified fiber diameter, softening point, and freedom from polar impurities, the oil-impregnated synthetic paper can have a reasonable low Gurley value (less than 20,000 seconds per 100 cc. of air measured using unimpregnated papers), an excellent dissipation factor (less than 0.001), a favorable dielectric constant at 60 cycles A.C. current (less than 3.0 at 80° C., preferably in the neighborhood of 2.0), and yet maintain a dielectric strength of at least 1400 volts per mil (about 55 volts/micron), preferably at least 1600 volts/mil (about 65 volts/micron), measured at a thickness of 5 mils (125 microns). It has been discovered that the above-mentioned polar impurities can be removed from the paper by extraction with a suitable solvent before the paper is impregnated with oil. This extraction permits the use of a number of non-polar polymers having the desired softening point characteristics.

Because of the excellent Gurley porosity values obtainable without loss of dielectric strength, the papers of this invention have excellent longitudinal and radial oil flow characteristics. This favorable Gurley porosity also means that impregnation of the insulation is greatly facilitated and resistance to damage caused by flexing, expansion, and contraction of the finished cable is increased.

The Gurley porosity values referred to are those obtained in accordance with ASTM test method D–726, method A. The papers of this invention are non-hydroscopic, are dimensionally stable, and resist degradation at temperatures well above 100° C. when impregnated with purified cable oil.

The invention will be further illustrated with reference to the accompanying drawing which is a perspective view of a single conductor power cable covered with insulation in accordance with the invention.

Referring more specifically to the drawings, there is seen a conductor 10 which may be of any metal conveniently used in high voltage power cables. Conductor 10 is wrapped with successive layers of synthetic oil-impregnated paper 12 and 14 in accordance with the invention. Gaps 16 and 18 between the successive layers are offset from one another in accordance with conventional practice. It will be understood that many successive wraps are generally applied to a single cable.

The papers useful in forming the insulation of this invention are formed from very fine synthetic organic fibers having average diameters below about 10 microns, and even more preferably below 6 microns. In some embodiments conventional larger diameter synthetic polymeric organic staple fibers (which may be of the same composition or other sufficiently non-polar composition) can be added to the microfibers in amounts up to about ½ of the total weight of the fibers to reinforce the physical strength of the papers without substantially reducing the electrical properties of the oil-paper combinations produced therefrom. Such reinforcing fibers should be below 30 microns in diameter and preferably about 18–22 microns.

The microfine fibers are preferably formed in accordance with the procedure described in Naval Research Laboratory Report No. 111437, dated Apr. 15, 1954, entitled "Manufacture of Superfine Organic Fibers." This procedure involves extruding a fine stream of molten polymeric material into a stream of heated gas which causes a breakdown or attenuation of the extruded material into tiny fibers. It has been found that a web or batt containing loosely raveled bundles or "ropes" of fiber can be obtained by collecting the fibers at a distance of 20 to 40 inches (about 50 to 100 cm.) from the nozzle orifice. Such a web can be compacted under heat and pressure below the melting point of the fibers to form papers useful for the present invention. At closer collection points individual fibers are formed directly into a dense paper-like web, which may be used as recovered or compacted further, if desired. The preferred papers are formed from fibers bonded together at the fiber junctures without losing their fiber identity. The larger diameter reinforcing fibers may be blown into the microfine fibrous web during formation thereof, or the large fibers can be deposited on a surface first and the microfibers deposited thereon to produce a paper construction having predominantly microfine fibers on one side, with the reinforcing fibers concentrated on the opposite side.

An alternative process for forming papers useful in this invention involves the use of conventional paper making techniques. The preferred wet process involves beating microfibers in water with a wetting agent to uniformly disperse the same. The aforementioned larger staple fibers are then mixed in without beating. Non-ionic wetting agents, such as high molecular weight polyether alcohols, are preferred because they can be readily washed out of the paper, and thus are not present to impair the electrical properties of the paper. The slurry is then deposited on a foraminous surface, such as a Fourdrinier screen, to form a wet waterlaid sheet which is dried in accordance with conventional paper making practices. It is preferred to extract any polar impurities, which increase the dissipation factor, from the paper with an organic solvent, such as methylene chloride or heptane.

It has been found that the oil-impregnated papers of this invention, unlike cellulosic papers, are not predictably affected by changes in apparent density. It appears that the fiber diameter characteristics have a much greater effect in this regard. More specifically, it has been discovered that if appropriate synthetic polymeric fibers are used, and the fiber diameters are as specified herein, a surprising increase in electric strength is obtained. The increase in electric strength cannot be explained on the basis of increased apparent density, as is shown in Example III. Generally speaking, all of the preferred polymeric fibers of this invention, i.e. fibers made from polymers which do not soften or degrade at temperatures up to 110° C., exhibit excellent dielectric strength characteristics when from 50 to 100% of the fibers are less than 10 microns in diameter. In the case of polypropylene fibers, a surprising increase in electric strength is obtained when 50 to 75% of the fibers are less than 10 microns in diameter, although continued improvement can be obtained in the range beyond 75%. When staple fibers instead of continuous fibers are used, excellent tensile strength is obtained when 60 to 90% (preferably 70 to 80%) of the fibers are below ten microns in diameter, the remainder of fibers being the reinforcing fibers referred to previously, i.e. fibers less than 30 microns and preferably about 18–22 microns in diameter. With any of our preferred polymeric fibers, a good electric strength, measured in kv./mil (or kv./mm.), is obtained over a wide range of paper thicknesses, the preferred range being 2–8 mils.

As pointed out previously, the polymer selected for making the microfine fibers is substantially free of polar groups or polar impurities and has a low dissipation factor, i.e. below about .001 at temperatures up to 110° C., a dielectric constant of less than 3.0 at 80° C., a glass transition temperature outside of the operating range, and a softening point above about 110° C. Preferably, the melting point of the polymer is above 140° C. When impregnated papers are made in accordance with this invention from fibers of suitable polymers having the specified fiber diameters, good electric strength is obtained. Although at least 1.4 kv./mil electric strength measured at 5 mils can easily be obtained, experience indicates that an electric strength as low as 1.2 kv./mil (48 kv./mm.), though not preferred, could be adequate in some high voltage environments.

The aforementioned suitable polymers include the polycarbonates, the polyphenyleneoxides, polypropylene, poly-4-methylpentene, and copolymers thereof with each other or other monomers which do not greatly decrease the physical or electrical properties of the resultant polymer. Examples of such suitable copolymers are the copolymers of propylene with minor amounts of ethylene or 1-butene, copolymers of propylene and 1-butene, copolymers of poly-4-methylpentene with suitable monomers, and the like. If desired, mixtures of fibers of various such compositions can be used.

In any event, the preferred synthetic papers of this invention are compatible with any of the known, commonly used cable oils, both natural and synthetic. For example, mineral oil, polypropylene oil, polybutene oil, and the like can be used as the impregnant and do not degrade the polymer.

The invention will be further explained with reference to the following examples in which all parts are given by weight, unless otherwise indicated.

EXAMPLE I

Dry process paper

Blown microfibers were formed from polypropylene resin (Dow 200) using the procedure, die design, nozzle arrangement and dimensions, specified in the Naval Research Laboratory—U.S. Department of Commerce publication #111437, Apr. 15, 1954, pages 1–2.

The extruder was operated at a temperature of 550° F. (288° C.) at the input end, and 650° F. (343° C.) at the die end. The extrusion die was operated at a temperature of 660° F. (349° C.). The extruder was operated at a rate of 502 g. of resin per hour. The resin emerging from the die was immediately blasted with hot air at 800° F. (427° C.), discharged at a pressure of 18 p.s.i. (1.2 atmospheres), at a flow rate of 6.7 cubic feet per minute.

The fibers produced by this method were collected in the form of a loose batt on a screen placed 12 inches (30.5 cm.) from the nozzle with the screen moving at a rate of .9 inch per second (2.3 cm./sec.). Five percent (numerically) of these fibers had diameters under 3.0 microns, 50% had diameters under 4.7 microns, and 95% had diameters under 9.7 microns.

This loose batt of fibers was lightly compressed by passing it between a 45 cm. steel roll and a paper idler roll on a calender. The steel roll was heated to 180° F. (82° C.). This compressed fiber batt was further compressed and heated in a hydraulic press using the following conditions.

An 8″ × 8″ (20.3 × 20.3 cm.) sample of the synthetic batt was placed between blotting paper sheets of the same size, which were placed between ¼ inch (0.63 cm.) aluminum plates of the same size. The assembly was then placed between the platens of a press. A pressure of about 66 kg./cm.$^2$ was applied at a temperature of 127° C. for 3 minutes, converting the batt into a highly compacted paper of uniform thickness in which fusion and joining had taken place in a fine textured pattern, leaving a substantial portion of the fibers in their fibrous form. This paper was found to have the following properties:

| | |
|---|---|
| Thickness (ASTM D374–57) | 0.15 mm. |
| Tensile strength | 1931 p.s.i. (136 kg./cm.$^2$). |
| Gurley porosity (ASTM D726 | 8,300 sec. per 100 cc. air. |
| Density | .59 gm./cc. |

This paper was then extracted with $CH_2Cl_2$ in a Soxhlet extractor for 2 hours to remove contaminants.

The extracted paper was dried to free it from $CH_2Cl_2$, and then impregnated with polybutene oil. The following electrical properties were obtained on this impregnated paper:

| | Kilovolts per mil (590 kv. per cm.) |
|---|---|
| Electric strength | 1.5 |
| Tan δ | .002 |
| Dielectric constant | 2.04 |

The physical properties remained substantially the same as before extraction.

Electric strength was run at 60 cycles per sec., 23° C. with 500 volts per sec. rate of voltage use according to ASTM D149–61, with ¼ inch (0.63 cm.) diameter electrodes with edges rounded to except a radius of ¹⁄₃₂ inch (.08 cm.), and the upper movable electrode weighing 1.25 lb. (567 g.). Tan δ and dielectric constant (K) were obtained at 110° C. and 60 cycles per sec. on a Schering Bridge. The electrode design is described in IEEE Testing Standard 83 The areas tested were ½ inch by 5 inches (1.27 by 12.7 cm.). Pressure on the electrodes was 15 pounds per square inch (1.05 kg./cm.$^2$).

EXAMPLE II

Wet process paper

Blown microfibers were formed by extruding the resin of Example I through a circular orifice having a diameter of 0.020 inch, having a drill bit (with shank portion removed) tightly fitted therein to aid heat transfer. The extruder was operated at a temperature of 550° F. (288° C.) at the input end, and 600° F. (316° C.) at the output end, the extrusion die temperature being at 715° F. (379° C.). The extruder was operated at a rate of 318 g. of resin per hour. The resin emerging from the die was immediately blasted with hot air at 700° F. (371° C.), which was discharged from a ¾ inch (1.9 cm.) opening at a pressure of 80 p.s.i. (5.44 atmospheres).

Five percent (numerically) of the fibers produced by this method had diameters under 1.2 microns, 50% had diameters under 1.4 microns, and 95% had diameters under 1.8 microns. The fibers were collected in the form of a loose batt on a screen placed 24 inches (61 cm.) from the nozzle, with the screen moving at .9 inch per second (2.3 cm./sec.).

Two grams of these fibers were placed in a Waring Blendor, along with 900 ml. of water and 50 ml. of 2% water solution of a wetting agent, stearyl dimethyl benzyl ammonium chloride. This mixture was agitated for 7 minutes at high speed. Then one gram of chopped polypropylene staple, three by ¹⁄₁₆ inch denier (1.6 mm.) long (treated with a small amount of wetting agent), was added and the mixture was agitated at high speed for one minute.

The above mixture was transferred to a papermakers handsheet maker, additional water was added, and the sheet was formed on fine mesh screen by drawing a vacuum while the mixture was kept in constant motion. The sheet was couched and dried at 100° C. This sheet was compressed and heated in a hydraulic press using the following conditions.

Just before pressing the sheet was sprayed thoroughly on both sides with atomized m-xylene. The sheet was then immediately placed between sheets of blotting paper and the aluminum plates as in Example I, and this assembly was placed in a press. Pressing conditions were as follows: Press temperature 260° F. (127° C.) total platen pressure 22 kg./cm.$^2$ for one and one-half minutes, followed by 66 kg./cm.$^2$ for two minutes. The xylene spray caused some solvent bonding of the fibers to occur due to dissolution or softening of the surfaces of the fibers.

The paper had the following properties:

| | |
|---|---|
| Thickness | .13 mm. |
| Tensile strength | 123 kg./cm.$^2$. |
| Gurley porosity | 1000 sec. per 100 cc. air. |
| Density | .55 gm./cc. |
| Elongation at rupture | 8 percent. |

This paper was then extracted with $CH_2Cl_2$ in a Soxhlet extractor for 7 hours. The extracted paper was dried to free it from $CH_2Cl_2$, and then impregnated with polybutene oil. The dry paper had the same physical properties as above. The following electrical properties were obtained on the oil impregnated paper:

| | kilovolts (root-mean-square) per mil |
|---|---|
| Electric strength | 1.5 |
| Tan δ | .0005 |
| Dielectric constant | 2.03 |

Test methods and conditions used were the same as in Example I.

EXAMPLE III

Comparison of wet process paper samples

Two sample insulation papers (hereinafter Sample A and Sample B) were prepared in accordance with Example II from polypropylene resin (Dow 200), which had been blown into microfibers in accordance with Example I and Hercules Corporation polypropylene staple fibers, ½ x 1.8 denier. By slurrying mixtures of the microfibers prepared according to Example I and the Hercules fibers, the slurrying being carried out as described in Example II, the sample synthetic paper sheets were made such that they contained specific amounts of fibers with a fiber diameter of less than 10 microns. The samples were formed into sheets on a hand sheet mold and pressed at 290° F. at 1250 p.s.i. for three minutes. The resulting sheets were then impregnated with polybutene insulating oil under vacuum at 80° C. for two hours. Virtually 100% of the blown microfibers incorporated in the samples have a fiber diameter less than 10 microns. The microfiber diameter distribution was such that 95% of the fibers had average diameters greater than 1.0 microns, 50% had average diameters greater than 1.7 microns, and 5% had average diameters greater than 3.8 microns. In the case of the Hercules Corporation staple polypropylene fibers, 95% of the fibers had a diameter greater than 12.8 microns, 50% had diameters greater than 17.0 microns, and 5% had diameters greater than 20.5 microns.

Sample A contained 25% and 75% of microfibers and Hercules fibers, respectively, while Sample B contained 75% microfibers and only 25% of the Hercules fibers. The electric strength of each sample was measured in accordance with ASTM D–149–64 with a 2″ diameter electrode heavy enough to apply pressure to the sheet of 25 p.s.i. The two samples were made such that their mil thicknesses and apparent densities were approximately the same. The results of the electric strength measurements were as follows:

SAMPLE INSULATION PAPERS

| Sample | Fiber diameter, Percent | | Thickness (mil) | Electric strength (kv./mil) |
|---|---|---|---|---|
| | <10μ | >10μ | | |
| A | 25 | 75 | 5.9 | 0.9 |
| B | 75 | 25 | 5.6 | 1.6 |

The improvement in electric strength cannot be explained on the basis of thickness or apparent density. The difference in thickness between Samples A and B is negligible, yet the improvement in electric strength is almost 180%.

This example demonstrates the overshadowing importance of fiber diameter as opposed to thickness and other variables.

What is claimed is:

1. A high voltage electrical cable comprising a conductor with an insulating material wrapped thereon, in which said insulating material comprises:

a synthetic paper having a Gurley porosity value, determined according to ASTM test method D726, method A, of less than 20,000 seconds per 100 cc. of air, fibers of which are a mixture comprising (a) at least 50%, by weight, of microfibers, said microfibers being less than 10 microns in diameter, and (b) a reinforcing amount of larger diameter staple fibers, said staple fibers being up to 30 microns in diameter, said microfibers and said staple fibers being high molecular weight, non-polar, synthetic organic polymeric fibers having surfaces which are essentially free of soluble polar impurities, the said non-polar synthetic polymer of said fibers having a softening point above 110° C., said paper being saturated uniformly with purified cable oil, thus providing said insulating material with a room temperature dielectric strength of at least 1400 volts per mil, when said dielectric strength is determined at an impregnated paper thickness of 5 mils, a dissipation factor less than 0.001, and a dielectric constant, when determined at 60 cycles A.C. current and at 80° C., of less than 3.

2. A cable according to claim 1 wherein said nonpolar synthetic polymer has a melting point above 140° C.

3. A cable according to claim 2 wherein said polymer is selected from the group consisting of polypropylene, poly-4-methylpentene, the polyphenylene oxides, the polycarbonates, copolymers thereof with each other, and copolymers of propylene with 1-butene and ethylene.

4. A cable according to claim 1 wherein 60 to 90% by weight of said fibers are said microfibers, substantially theremainder of said fibers being said staple fibers.

5. A cable according to claim 1 wherein substantially all of said microfibers have diameters less than 6 microns, and a major amount of said staple fibers have diameters greater than 12.8 microns.

6. An oil saturated synthetic paper for use as high voltage insulation consisting essentially of a synthetic paper having a Gurley porosity value, determined according to ASTM test method D726, method A, of less than 20,000 seconds per 100 cc. of air, the fibers of which are a mixture comprising (a) at least 50%, by weight, of microfibers, said microfibers being less than 10 microns in diameter, and (b) a reinforcing amount of larger diameter staple fibers, said staple fibers being up to 30 microns in diameter, said microfibers and said staple fibers being high molecular weight, non-polar, synthetic organic polymeric fibers having surfaces which are essentially free of soluble polar impurities, the said non-polar synthetic polymer of said fibers having a softening point above 110° C., said paper being saturated uniformly with purified cable oil, thus providing said oil-saturated paper with a room temperature dielectric strength of at least 1400 volts per mil, when said dielectric strength is determined at an impregnated paper thickness of 5 mils, a dissipation factor less than 0.001, and a dielectric constant, when determined at 60 cycles A.C. current and at 80° C., of less than 3.

7. An oil saturated synthetic paper according to claim 6 wherein said non-polar synthetic polymer has a melting point of at least 140° C.

8. An oil saturated synthetic paper according to claim 7 wherein said polymer is selected from the group consisting of polypropylene, poly-4-methylpentene, the polyphenyleneoxides, the polycarbonates, copolymers thereof with each other, and copolymers of propylene with 1-butene and ethylene.

9. An oil saturated paper according to claim 6 wherein 60 to 90% by weight of said fibers are said microfibers, substantially the remainder of said fibers being said staple fibers.

10. An oil saturated paper according to claim 6 wherein substantially all of said microfibers are less than 6 microns in diameter, and a major amount of said staple fibers are greater than 12.8 microns in diameter.

11. An oil saturated paper according to claim 6 wherein said fibers are fused together at their points of juncture, but retain their fibrous form.

12. An oil saturated paper according to claim 6 wherein said paper is a wet process paper.

References Cited

UNITED STATES PATENTS

| | | | |
|---|---|---|---|
| 2,905,585 | 9/1959 | Hobbard | 162—157 |
| 3,049,466 | 8/1962 | Erlich | 162—157 |
| 3,077,510 | 2/1963 | Olds | 174—25 |
| 3,077,514 | 2/1963 | Kang. | |
| 3,229,024 | 1/1966 | Kang | 174—110 X |
| 3,376,378 | 4/1968 | Bullock. | |

ELLIOT A. GOLDBERG, Primary Examiner

U.S. Cl. X.R.

117—138.8; 161—92, 140, 165; 162—138, 146; 174—110, 120

UNITED STATES PATENT OFFICE
CERTIFICATE OF CORRECTION

Patent No. 3,532,800          Dated   October 6, 1970

Inventor(s) Grayson F. Wyly and Charles A. Buehler

It is certified that error appears in the above-identified patent and that said Letters Patent are hereby corrected as shown below:

In Column 4, line 63, change "fre" to -- free -- .

In Column 5, line 55, change "non-hydroscopic" to
                              -- non-hygroscopic -- .

In Column 8, line 28, in the column headed "Kilovolts per mil"
                 change ".002" to -- .0002 -- ;
        line 40, after "Standard 83" insert a period
                            -- . -- ;
        line 71, after "three" insert -- denier -- , and
               after "inch" delete "denier", so that
               the line will read
-- propylene staple, three denier by 1/16 inch (1.6 mm.) long --

In Column 9, line 48, after "1/2" insert -- inch -- so that
                 the phrase reads -- 1/2 inch x 1.8 denier
                 -- .

In Column 10, line 54, leave a space between the first two
                  words so they will read -- the remainder
                  -- .

Signed and sealed this 10th day of August 1971.

(SEAL)
Attest:

EDWARD M. FLETCHER, JR.        WILLIAM E. SCHUYLER, JR.
Attesting Officer              Commissioner of Patents